United States Patent

Shimizu et al.

[11] Patent Number: 4,588,660
[45] Date of Patent: May 13, 1986

[54] FUEL CELL

[75] Inventors: Toshio Shimizu, Katsuta; Takanori Satoo, Hitachi; Ryota Doi, Ibaraki; Motoo Yamaguchi, Hitachi; Tsutomu Tsukui, Hitachi; Yoshio Yoshioka, Hitachi, all of Japan

[73] Assignee: Hitachi, Ltd., Tokyo, Japan

[21] Appl. No.: 714,921

[22] Filed: Mar. 22, 1985

[30] Foreign Application Priority Data

Mar. 23, 1984 [JP] Japan .................................. 59-55703

[51] Int. Cl.[4] .................. H01M 8/02; H01M 8/24
[52] U.S. Cl. .................................. 429/35; 429/37; 429/39
[58] Field of Search ............... 429/35, 36, 37, 38, 429/39

[56] References Cited

U.S. PATENT DOCUMENTS 3,126,302  3/1964  Drushella .................. 429/38
3,278,336  10/1966  Uline et al. ................ 429/35
3,530,005  9/1970  Leonard .................... 429/39

Primary Examiner—Donald L. Walton
Attorney, Agent, or Firm—Antonelli, Terry & Wands

[57] ABSTRACT

A fuel cell made up of a pile of unit cells, each consisting of a pair of cell element and separator packed in a cell frame, in which there are formed a fuel feed path and oxide product evacuation path in the piling direction. The cell frame is provided between its inner edge offsets and the outer edges of the cell element and separator with inner packings, and further provided near its outer edge on one side with an outer packing. The sealing structure perfectly prevents a fuel leak, and yet allows compactness and easy assembling process.

9 Claims, 8 Drawing Figures

FUEL CELL

FIELD OF THE INVENTION

The present invention relates to a fuel cell which directly produces electrical energy through the electrochemical reaction of fuel, and particularly to a fuel cell with the provision of environmental security in the sealing structure against the leakage of fuel to the oxidizer feed path and to the exterior of the cell and with the structure of easily piling a large number of unit cells.

DESCRIPTION OF THE PRIOR ART

Figure 1:
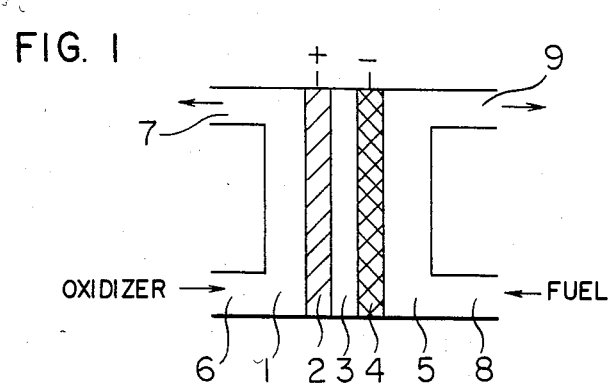
FIG. 1 is an illustration showing the principle of the fuel cell.

In FIG. 1, a fuel cell consists of an oxidizer room 1, a cathode electrode 2, an electrolyte 3, an anode electrode 4, and a fuel room 5. The oxidizer room 1 communicates with an oxidizer feed path 6 and an evacuation path 7, and the fuel room 5 communicates with a fuel feed path 8 and a fuel evacuation path 9. In operation, the fuel such as methanol, folmalin, hydrogen and ammonia, is supplied through the feed path 8 and the fuel room 5 to the anode electrode 4, while the oxidizer, such as oxygen and air, is supplied through the feed path 6 and the oxidizer room 1 to the cathode electrode 2, so that the following electrochemical reaction occurs by the contribution of catalyzers, such as platinum, ruthenium and tin on the electrodes 2 and 4 thereby to produce electrical energy directly.

In case of methanol fuel cell,
anode
$$CH_3OH + H_2O \rightarrow CO_2 + 6H^+ + 6e$$
cathode:
$$3/2\ O_2 + 6H^+ + 6e \triangle 3H_2O$$

Figure 2A:
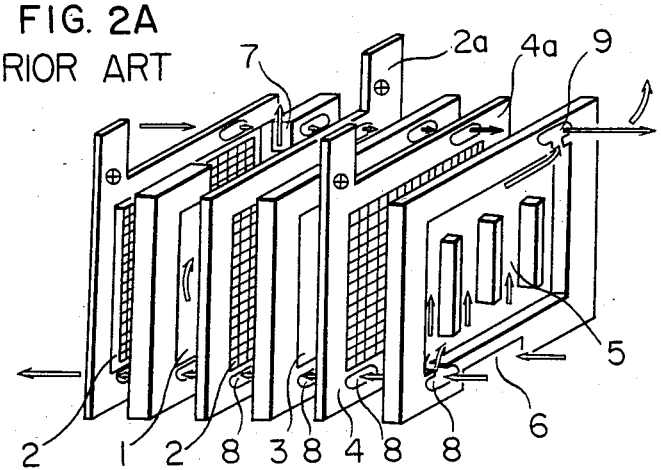
FIGS. 2A and 2B are an assembly diagram and a partially enlarged view of the conventional piled fuel cell.
Figure 2B:
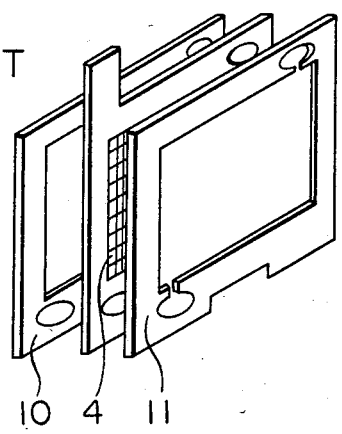

In general, a complete fuel cell is made up of a pile of many unit cells each structured as mentioned above. In such a piled fuel cell, the fuel feed path 8 for supplying the fuel to the anode electrode 4 is formed through collectors 2a and 4a that support the cathode electrode 2 and anode electrode 4, respectively, at their outer edge sections. In each cell element, the cathode electrode 2 and anode electrode 4 are interleaved by the electrolyte 3, and the collectors 2a and 4a of each electrode are interleaved by insulators 10 and 11 that work to block the conduction of electrons and prevent the leakage of electrolyte which soaks into the electrolyte 3. The insulators 10 and 11 also have openings in alignment with those of the collectors, as shown in FIG. 2B, to complete the fuel feed path 8.

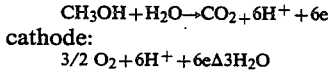

In the case of serial piling of unit cells, components of unit cells need to be assembled with a packing interposed therebetween and not shown, and the insulators 10 and 11 need to have an additional width so as to accommodate the oxidizer room 1 for supplying the oxidizer to the cathode electrode 2 and the fuel room 4 for supplying the fuel to the anode electrode 4. On this account, it is difficult for the conventional piled fuel cell to be made compact.

Furthermore, in piling unit cells, the cathode collector 2a of the first unit cell is connected electrically to the anode collector 4a of the second unit cell, and there must be an interposition of packing material for preventing the leakage of fuel.

In addition, the conventional fuel cell needs external electrical connections between elements after they have been assembled with an interposition of packing or using adhesive.

Thus, the conventional piled fuel cell has problems: (1) the collectors are thick and heavy, precluding the compactness of the cell structure, and (2) the assembling method of using a packing material or adhesive causes an increased fabricating process for the external electrical connection and also causes a complex sealing structure, raising the manufacturing cost and precluding the compactness of the cell structure as well.

SUMMARY OF THE INVENTION

It is an object of the present invention to provide a fuel cell consisting of piled unit cells each made up of components packed in a cell frame, with the provision of a simple and inexpensive sealing structure capable of preventing completely the fuel supplied from the fuel feed path from leaking into the oxidizer feed path and to the exterior of the cell.

The invention resides primarily in the sealing structure of a piled fuel cell. The structure includes a pile of cell frames in which a fuel feed path and a product evacuation path are formed in the thickness direction. At the inner edge sections on both sides of the cell frame, there are formed annular offsets in which a cell element and a separator are fitted with packings for inner sealing being interposed between the outer edges of these components and the inner faces of the annular offsets. The cell frame is further provided on its front or back side with a packing for outer sealing which runs continuously along the frame at a position at least nearer to the outer edge of the frame than the fuel feed path and product evacuation path.

The cell element and separator are packed in the cell frame provided with inner and outer packings to complete a unit cell, and a plurality of unit cells are piled to complete a fuel cell which completely prevents the leakage of fuel into the oxidizer feed path or to the exterior of the cell.

DESCRIPTION OF THE PREFERRED EMBODIMENTS

Figure 3:
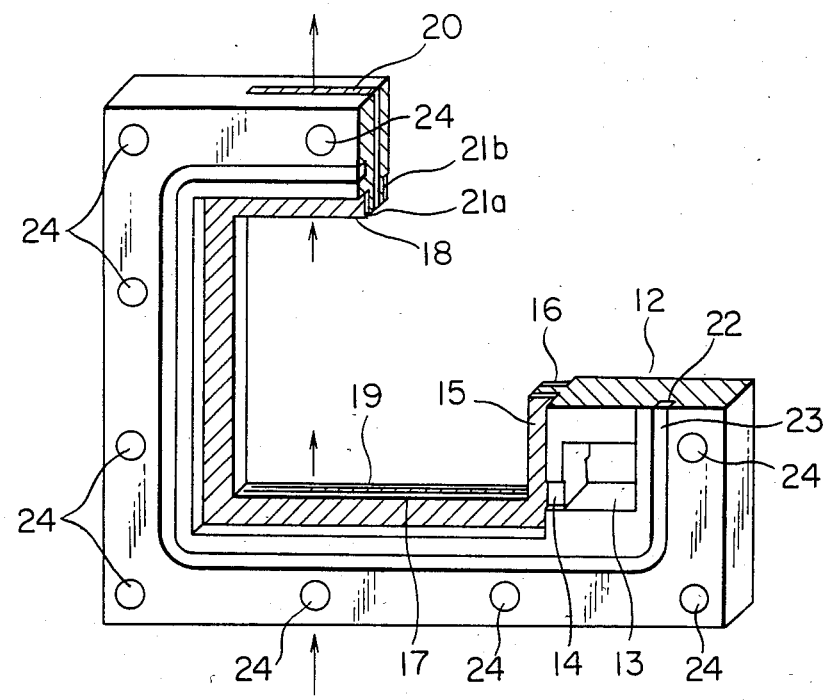
FIG. 3 is a perspective view partly broken away showing the structure of the cell frame according to the present invention.

The embodiments of the present invention will now be described with reference to the drawings. FIG. 3 shows the structure of the inventive cell frame provided with the inner packings and outer packing. Reference number 12 denotes a cell frame made of plastics, in which there is formed a fuel feed path 13 running in the thickness direction with the formation of a fuel branch path 14 for supplying the fuel to a fuel room which is in connection with the fuel feed path and anode electrode. At the inner edge sections on both sides of the cell frame 12, there are formed annular offsets 15 and 16. On confronting surfaces 17 and 18 on the edge face between the annular offsets 15 and 16, there are formed an oxidizer feed path 19 for supplying the oxidizer to the cathode electrode and an evacuation path 20 for evacuating the substance produced by the cathode electrode and the residual oxidizer, partly in the form of grooves.

A cell element and a separator are fitted in the annular offsets of the cell frame 12 with inner packings 21a and 21b being provided between the outer edges of these components and the inner faces of the annular offsets 15 and 16. The inner packings are made of rubber or thermoplastics in the shape of sheet or cord.

On one side of the cell frame 12, there is formed an outer packing groove 22 running continuously along the cell frame 12 at the position at least nearer to the outer edge of the cell frame 12 than the position of the fuel feed path 13 and the product evacuation path (not shown), and an outer packing 23 is embedded in the groove 22. The outer packing 23 serves to seal off the fuel feed path 13 from the outside when unit cells each made up of a cell element and separator packed in the cell frame 12 are piled to form a complete fuel cell. The cell frame 12 has a number of holes 24 along its outer rim, and these holes are used by clamp bolts for integrating many unit cells.

Figure 4:
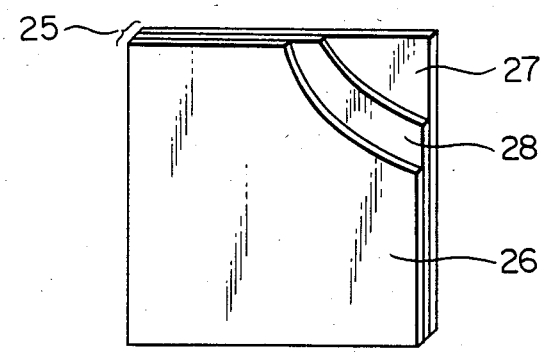
FIG. 4 is a perspective view partly broken away showing the cell element of the inventive fuel cell.

FIG. 4 shows a cell element 25 which consists of a cathode electrode 26 and an anode electrode 27 interleaved by electrolyte 28.

Figure 5A:
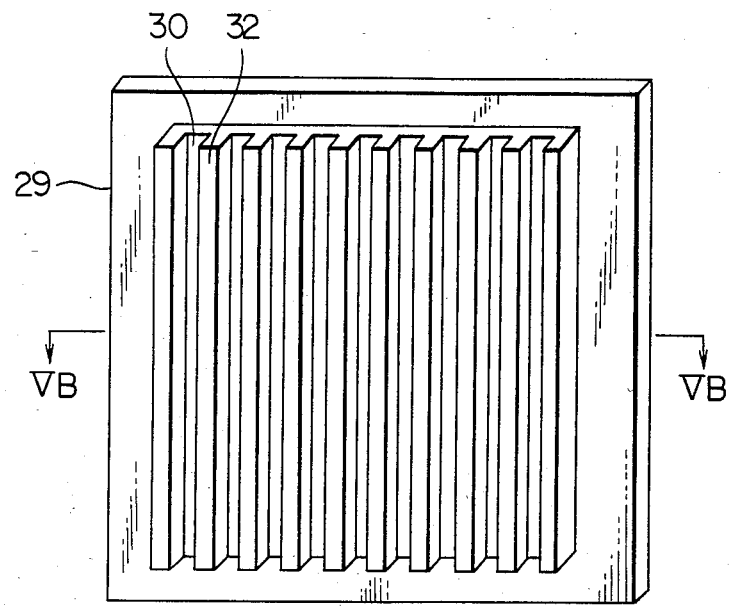
FIGS. 5A and 5B are a perspective view and a lateral cross-sectional view from VB—VB showing an example of the separator used in the inventive fuel cell.
Figure 5B:
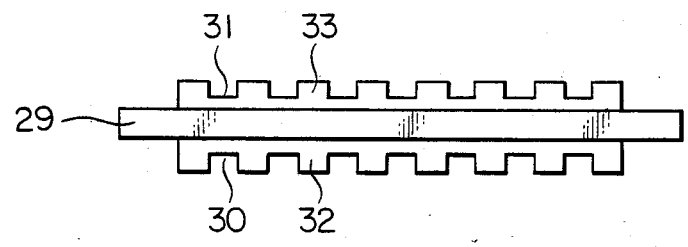

FIGS. 5A and 5B show the external view of the separator 29 which is made of a conductive material such as graphite. On both sides of the separator 29, many grooves 30 and 31 and ridges 32 and 33 are formed. The grooves 30 on one side form a fuel room between the anode electrode 27 of the cell element 25 and the separator 29, while the grooves 31 on another side form an oxidizer room between the separator 29 and the cathode electrode 26 of the cell element 25.

Figure 6:
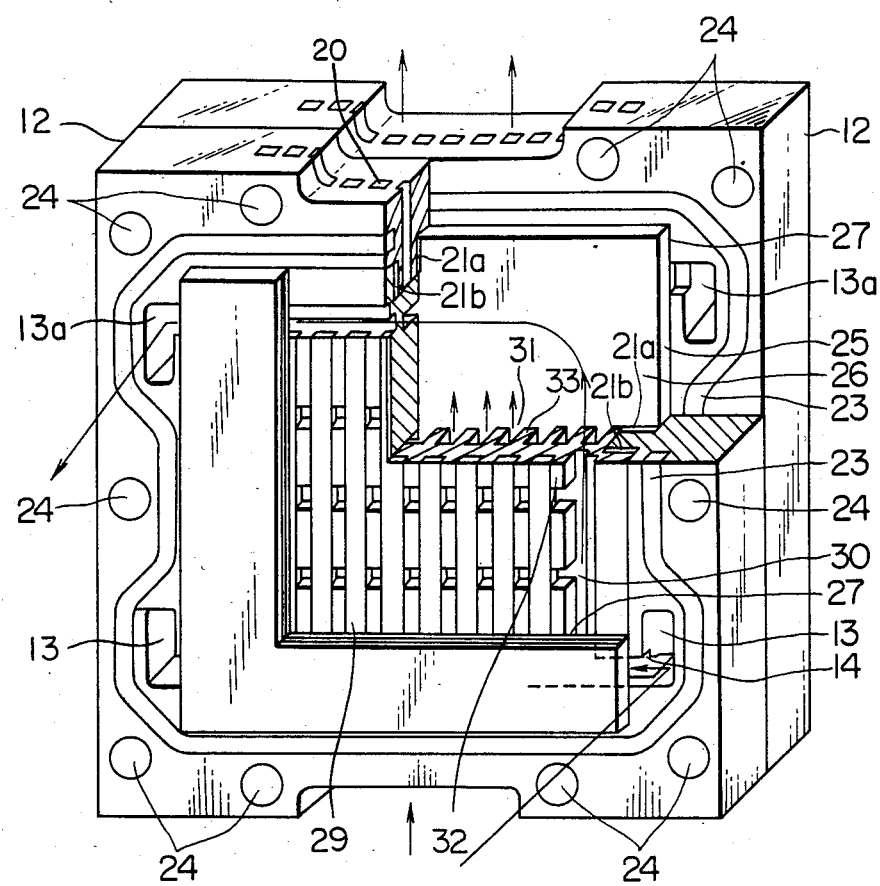
FIG. 6 is a perspective view partly broken away showing the assembly of the inventive cell element and separator packed in the cell frame.

FIG. 6 shows the assembly of two unit cells each including a cell element and separator packed in a cell frame. In the piled state, the separator 29 forms a fuel room 30 and oxidizer room 31. The oxidizer room 31 introduces oxidizer such as air from the outside through the oxidizer feed path 19 provided in the cell frame 12 so that it is supplied to the cathode electrode 26, and evacuates itself of the oxide product, such as water for a cell of using methanol as fuel, through the evacuation path 20 to the outside of the cell frame 12. The fuel room 30 formed by the separator 29 receives the fuel through the fuel feed path 13 and branch path 14 so that it is supplied to the anode electrode 27. The oxide product, such as carbon dioxide for a cell of using methanol as fuel, created by the anode electrode 27 is evacuated to the outside of the cell frame 12 through the product evacuation path (not shown) located symmetrically to the fuel feed path 13.

The separator has grooves on both sides to form the fuel room 30 and oxidizer room 31, and ridges 32 and 33 of the separator 29 are in electrical contact with the anode electrode 27 and the cathode electrode 26, respectively.

The assembly of two unit cells each including a cell element 25 and a separator 29 packed in a cell frame 12 is shown in FIG. 6. The cell frame 12 in this arrangement differs from that shown in FIG. 3 in that two fuel feed paths 13 and evacuation paths 13a are provided in the cell frame 12, and that the outer packing 23 is shaped so that the dimensions of the cell frame is made smaller. Both arrangements of cell frame function identically.

The following describes the sealing effect for the fuel by the inner packings 21a and 21b and the outer packing 23. The fuel is introduced through the fuel feed path 13 and branch path 14 formed in the cell frame into the fuel room 30, and supplied to the anode electrode 27. The leakage of fuel at the laminated portion of the cell frames 12 is blocked by the outer packing 23, and the leakage of fuel into the oxidizer room 31 is blocked by the inner packings 21a and 21b. Thus, the leakage of fuel to the outside of the cell or to the oxidizer path can surely be prevented.

One or both of the outer packing 23 and inner packings 21a and 21b in the foregoing embodiment may be replaced with adhesive without a significant change in the ability of blocking a fuel leak and its penetration to the oxidizer path.

As can be seen from the foregoing description, the present invention facilitates the piling of many unit cells that are subassemblies of components such as a cell element and a separator packed in a cell frame, allows the formation of the fuel feed path through the cell frames in the direction of piling, and achieves the complete blocking of a fuel leak to the outside and to the oxidizer path, whereby a light weight, inexpensive and safe fuel cell can be realized.

We claim:

1. A fuel cell comprising a cell frame in which there are formed a fuel feed path and a product evacuation path passing through said frame in the thickness direction, said frame having a formation of annular offset sections at the inner edge sections on both sides with a cell element and a separator being fitted to said offset sections, said separator being formed by a conductive material and provided with grooves and ridges on both sides thereof and the top surfaces of said ridges of one side thereof being electrically connected to said cell element, said frame being provided with inner packings between the outer edges of said cell element and separator and the inner faces of said annular offset sections, said frame being further provided with an outer packing which runs continuously along one side of said frame at a position at least nearer to the outer edge of said frame than positions of said fuel feed path and products evacuation path, said cell element being positioned at one side of the annular offset section through said packing and said separator being positioned at the other side of the annular offset section through said packing.

2. A fuel cell according to claim 1, wherein said cell element comprises an anode electrode and a cathode electrode interleaved by an electrolyte.

3. A fuel cell according to claim 1, wherein said inner packings and said outer packing are made of rubber or thermoplastics.

4. A fuel cell comprising a cell frame in which a fuel feed path and a product evacuation path are formed, said frame having annular offset sections at inner edge sections of said frame, a cell element and a separator arranged in fitting relationship with said annular offset sections, said separator comprising a conductive material and being provided with grooves and ridges one each side thereof, said ridges on one side of said separator being electrically connected to said cell element, inner packings between outer edges of said cell element and said separator and inner faces of said annular offset sections, and an outer packing running continuously along one side of said frame between the outer edge of said frame and said fuel feed and product evacuation paths.

5. A fuel cell according to claim 4, wherein said cell element is positioned at one side of said annular offset sections so as to be sealed by said inner and outer packings.

6. A fuel cell according to claim 5, wherein said separator is positioned at the other side of said annular offset section so as to be sealed by said inner and outer packings.

7. A fuel cell according to claim 4, wherein said cell element and said separator are positioned on respective sides of said annular offset sections by said packings.

8. A fuel cell according to claim 4, wherein said cell element comprises an anode electrode and a cathode electrode with an electrolyte between said cathode and anode electrodes.

9. A fuel cell according to claim 4, wherein said inner packings and said outer packing are made of rubber or thermoplastics.

* * * * *